Jan. 27, 1970   D. J. O'CONNOR ET AL   3,492,016
WHEELED VEHICLE
Filed April 18, 1968
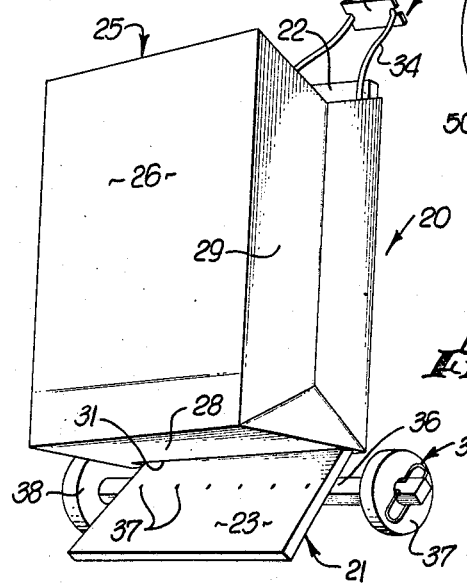
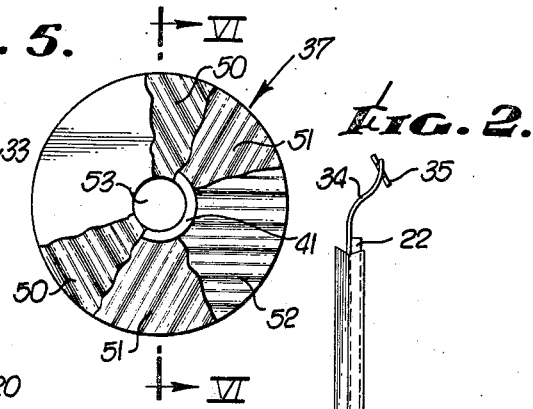
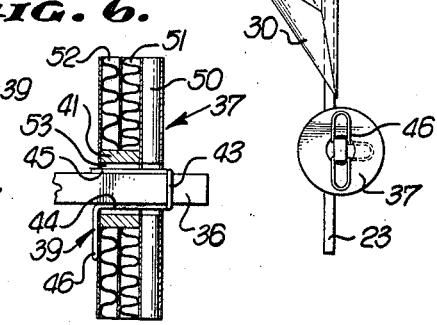
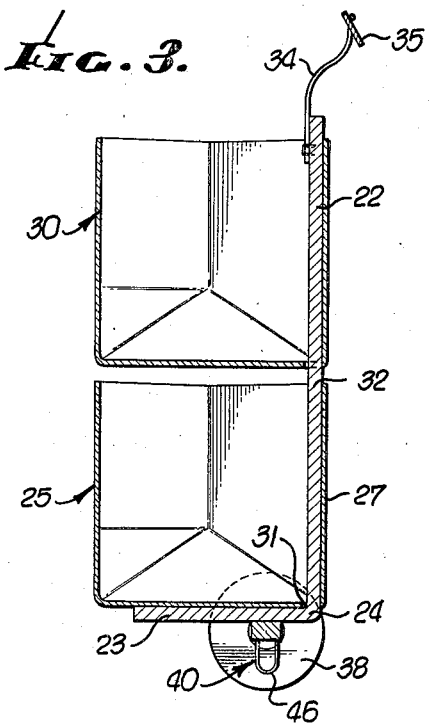
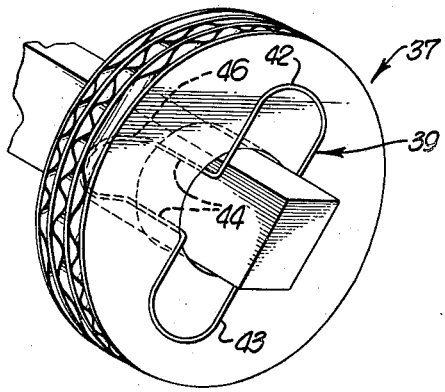
INVENTORS.
DENNIS J. O'CONNOR
LEO G. WHITAKER
By
Miketta, Glenny, Poms & Smith
ATTORNEYS.

United States Patent Office 3,492,016
Patented Jan. 27, 1970

3,492,016
WHEELED VEHICLE
Dennis J. O'Connor, 3701 W. 1st St., Apt. 202, Los Angeles, Calif. 90004, and Leo G. Whitaker, 254 Kenneth Road, Glendale, Calif. 91202
Filed Apr. 18, 1968, Ser. No. 722,408
Int. Cl. B62b 1/18; B60b 5/00
U.S. Cl. 280—47.26                                 9 Claims

ABSTRACT OF THE DISCLOSURE

A wheeled vehicle for use as a shopping cart or the like formed of economical material, including a preferably corrugated-paperboard frame, a paper bag, and axle means and wheels. The bag is provided with an opening to receive the frame which may be constructed of a single sheet of corrugated-paperboard and requires only minimal attachment so as to facilitate construction. There are also disclosed wheels which are constructed of corrugated-paperboard sheets having an opening, useable with a variety of wheeled vehicles for any purpose, and which are extremely inexpensive and yet constructed to provide considerable strength and durability.

---

While the present invention was conceived in relation to shopping carts for use in transporting groceries, it will be apparent that the wheeled vehicle forming the subject matter of the present invention may be used for transporting a wide variety of items and articles in various environments. Particularly, the corrugated-paperboard wheel forming a part of this invention will be seen to be useful for various types of containers and vehicles, such as toys or the like.

The problems which gave rise to the need for an inexpensive and limited-life wheeled container arose principally from the marketing of groceries from supermarkets. In the present supermarket industry, a shopper within a store is generally provided with a metallic wheeled carrier for transporting goods which are collected from shelves to a checkout counter. While these carriers are extremely durable, they are expensive and are intended to be used exclusively within the store. However, supermarket operators have found that the utility of such metallic wheeled containers for purposes other than the collection of groceries within a store has given rise to serious problems of theft. In most supermarkets, the shopper is permitted to use the metal wheeled basket to remove the groceries from the store to an adjoining parking lot wherein the bagged groceries may be placed into the shopper's car. These market baskets are generally left in the parking lot, and may therefore be easily removed and converted to private use. Such baskets may also be removed directly from the store to the purchaser's home.

Moreover, in areas where automobile transportation is not as prevalent, and supermarkets are located convenient and nearby to dwelling units, shoppers may be forced to transport their groceries to their home by either carrying shopping bags or purchasing a wheeled metal container. Since housewives have neither the strength nor endurance to hand carry shopping bags of groceries, the former alternative is entirely undesirable. Moreover, the purchase of a wheeled metal container is not only expensive but is inconvenient in that the container must be carried to and from the supermarket and to other locations which the shopper may visit during the course of a shopping tour.

Accordingly, it is believed to be of great advantage to both supermarket operators and to shoppers to have an inexpensive wheeled container for use as a shopping cart. Such devices are known in the prior art, but it has been found to be extremely difficult to construct a shopping cart of inexpensive materials but which also will sustain the relatively heavy loads involved in transporting large purchases of groceries. Such devices have been constructed largely of corrugated-paperboard material which is obviously more expensive than ordinary paper bag material. Of particular disadvantage in such prior art devices is the use of wooden wheels which, as compared to paperboard material, is substantially more expensive.

Another disadvantage of such prior art devices is that, in some instances, the devices have not been foldable thereby occupying considerable space. Non-folding wheeled containers are only inconveniently and expensively stored by the supermarket operator or by the shopper. Even where such devices have been foldable, they have been afflicted with the storage problem involved in the preassembly of the wheels to the axis that is secured to the container. Such preassembly has been required because wooden wheels and axles are not easily secured together at the point where the containers are sold or given away, such as a supermarket.

Furthermore, such preassembly has involved not only the wheels and axles, but has also involved the preassembly of the container portion of the wheeled vehicle which has required considerable labor in fabrication and has made assembly at the point of sale nearly impossible.

Prior art shopping carts, such as those disclosed in U.S. Patent Nos. 3,087,740 and 3,285,620, for example, are also extremely complex by comparison to the present invention. Such devices require corrugated sheets with multiple fold-lines, slots and cut-outs which substantially increase the cost of manufacture and of construction. Moreover, the wheels and means for securing the wheels and axles together are complicated and expensive.

Generally, the present invention provides a wheeled vehicle comprising a frame which includes relatively inflexible back and bottom portions, a foldable bag having front, rear, bottom and opposed side walls and in which the bottom wall has a transverse opening for receiving the back portion of the frame, the back portion of the frame and the bag rear wall being secured together, and axle and wheel means provided on the bottom portion of the frame including means for securing the wheels on the axle.

The invention also comprises a wheel for use on a wheeled vehicle which is constructed of a plurality of laminated sheets of corrugated-paperboard having an opening for receiving an axle and in which the sheets are positioned so that the corrugation which substantially intersects the axis of rotation in each sheet is angularly disposed to the corrugation in every other sheet so as to form a high-strength, durable, load-bearing wheel.

It is therefore a general object of the present invention to provide a wheeled container or vehicle and a wheel for use on such devices which avoid all of the foregoing disadvantages of similar types of devices used heretofore.

An object of the present invention is to provide a wheeled vehicle constructed of inexpensive materials, which can be easily fabricated by unskilled labor and is characterized by extreme simplicity.

Another object of the present invention is to provide a wheel vehicle having a frame preferably constructed of corrugated-paperboard which cooperates with a paper bag having an opening for receiving a portion of the frame, the bag and frame being attached by suitable means readily available and easily applied regardless of where these components are fabricated.

Still another object of the present invention is to provide a wheeled vehicle of the above-described type which is foldable so as to occupy a minimum volume during storage by either the user or distributor of such devices.

Yet another object of the present invention is to provide, for use with a wheeled vehicle, a wheel which is constructed of sheets of corrugated-paperboard material having an opening for receiving the axle wherein the separate sheets are arranged to provide a wheel of high-strength, durability, and good load-bearing characteristics.

One more object of the present invention is to provide a wheeled container comprising a corrugated-paperboard frame and one or more high-strength tear resistant bags and having wheels attached to an axle by simple spring wire clips or retainers.

Other objects and advantages of this invention will be readily apparent from the following description when considered in connection with the appended drawings.

In the drawings:

FIG. 1 is a perspective view of a wheeled vehicle constructed in accordance with the present invention;

FIG. 2 is a side elevation view of the vehicle shown in FIG. 1 shown in the folded position;

FIG. 3 is a side elevation view of a modified wheeled vehicle in a position ready for use;

FIG. 4 is a detailed perspective view of a wheel constructed in accordance with the present invention;

FIG. 5 is a side elevation view of the wheel shown in FIG. 4 having portions thereof broken away; and FIG. 6 is a side sectional view of the wheel shown in FIG. 5 shown mounted on the axle.

Referring now to FIGS. 1 through 3, there is shown an exemplary embodiment of a wheeled vehicle container, for use as a shopping cart or the like, generally indicated at 20. Vehicle 20 includes a corrugated-paperboard frame generally indicated at 21 including a relatively inflexible back portion 22 and a bottom portion 23. Frame 21 is constructed so that the direction of the corrugations in the single sheet of corrugated-paperboard comprising the frame are longitudinally oriented. In this manner, the back portion of the frame will best sustain loads in a vertical direction when the shopping cart is tilted, as in use.

The single sheet of double-walled corrugated-paperboard of approximately 350 lbs. bursting strength comprising frame 21 has a fold line 24 so as to define the back and bottom portions of the frame.

Frame 21 may support a foldable bag of heavy kraft of about 80 lbs. bursting strength single-ply paper, generally indicated at 25, having a front wall 26, rear wall 27, bottom wall 28, and opposed side walls one of which is shown at 29. The side walls are provided with fold lines as is front wall 26, in the well-known and ordinary manner so that the bags may be easily folded as shown in partial folded condition in FIG. 2. The bottom wall 28 of bag 25 is provided with a transversely extending opening 31 for receiving the back portion of frame 21 which extends through the bag 25 and above the upper edge of the bag. In FIG. 3 is shown a modified embodiment in which bag 25 is shorter than frame back portion 22, and a second bag 30, preferably identical to bag 25 is positioned above bag 25.

Means is provided for attaching the back wall 27 of bag 25 to the back portion 22 of frame 21 so as to secure the bag and frame together. In the exemplary embodiment, the attaching means is illustrated as glue; it will be understood however that other types of attaching means, such as staples, or the like, may be used for attaching the bag to the frame. Bag 30 may be similarly secured to the frame. Handle means 33 comprises a flexible member 34, such as rope or twine, stapled at each end to the upper end of frame back portion 22 and a gripping member 35 provided for tilting and pulling the cart 20.

Axle means is supported by the bottom portion 23 of frame 21 and in the exemplary embodiment is illustrated as a simple longitudinally extending rectangular cross-section wooden member 36. Axle member 36 is fixedly secured to the bottom surface of bottom portion 23 by means of a plurality of heavy duty staples 37, although it will be understood that glue or similar attaching means may be used to secure axle 36 to frame 21. As may be seen in FIG. 1, axle 36 extends outboardly of foldable bag 25. Wheels 37, 38 are received on the outboard ends of axle 36 through circular openings. Wheels 37 and 38 are secured to axle 36 by means of identical removable fasteners 39, 40 respectively, as best seen in FIG. 4. As seen in FIGS. 4 and 5, the wheel may be provided with a cylindrical cardboard bearing 41, having a length less than the thickness of the wheel. Bearing 41 is restrained from moving axially outwardly by providing the outboard sheet of the wheel with a smaller diameter opening than the other sheets preferably equal to the inner diameter of bearing 41.

Referring to FIGS. 4 and 6, particularly, fastener 39 includes oppositely disposed retainer portions 42, 43 positioned outboardly of each of the wheels, gripping portions 44, 45 which are resiliently biased towards one another and snugly received on axle 36, and a single inboard retainer portion 46. Thus, fasteners 39 and 40 are removably secured on the outboard end of axle 36 so as to restrain lateral movement of wheels 37 and 38 by insertion through the openings between the circular inner edge of the wheel and the rectangular axle. The wheel is restrained against wobble about a vertical axis by the edge of the frame bottom portion 21 and the horizontally disposed retainer portions 42, 43 and about a horizontal axis by retainer portion 46 and the edge of frame back portion 22.

From the above description, it will be apparent that the present invention provides a shopping cart which is entirely constructed of inexpensive materials such as paper, corrugated-paperboard, wood and wire. The cart 20 may be easily assembled by unskilled labor at the location, such as a supermarket, from which the cart will be sold or given away as a premium item. The cart 20 is assembled by stapling the flexible handle members 34 to the upper end of back portion 22 of frame 21. The bottom portion 23 of frame 21 is then inserted through transverse opening 31 in shopping bag 25. Axle 36 may then be fitted with the fasteners 39 and 40 which are pre-inserted into the circular openings of wheels 37 and 38 and the axle 36 is then stapled to the lower surface of frame bottom portion 23. Due to the ease of assembly, all of the components of cart 20 may be shipped to the site from which the carts are distributed in compact shipping containers. Even after cart 20 is assembled, it may be folded, as seen in FIG. 2, so as to occupy a very limited space in the supermarket or other distribution point.

In use, as shown in FIG. 3, the bags 25 and 30 are unfolded and may be filled with groceries. Grocery items are initially positioned adjacent the rear of the lower paper bag 25 so that the center of gravity of such groceries is rearwardly of the axis of axle 36. In this manner, the entire shopping cart 20 may be tilted by laterally pulling handle 35 which will cause the entire cart to tilt toward the operator. It will be appreciated that it is unnecessary to attach or secure the bottom wall 28 of foldable bag 25 to the bottom portion 23 of frame 21 since proper positioning of axle 36 with respect to fold line 24 of the frame 21 will prevent separation when the cart is tilted. Moreover, proper positioning of the axle also assures that bottom portion 23 of the frame will withstand substantial loads, such as 60 pounds or more.

The present invention also provides an extremely economical wheel for use on an inexpensive wheeled container or vehicle, such as the above-described shopping cart, or, for example, toys or similar vehicles. The wheel, indicated at 37, in FIGS. 4, 5 and 6, may comprise three laminated single-wall corrugated-paperboard sheets 50, 51 and 52, althought such sheets may be double-wall as well known in the art. Each of the sheets comprises a corrugated inner layer disposed between flat outer layers and, if desired, the outer layer of the inner sheets may be common to two adjacent sheets. Wheel 37 is provided with an opening 53 for receiving an axle about which it rotates. While a circular wheel with a central opening is illustrated, it will be appreciated that the wheel may be eccentric to provide irregular rotation and consequent vibration of the vehicle as desired in some applications.

It is known that corrugated-paperboard has considerably more load bearing capacity in the direction parallel to the corrugations as opposed to the direction transverse to such corrugations. The present invention utilizes this characteristic to provide good load bearing capacity of a wheel by disposing adjacent corrugated-paperboard sheets angularly with respect to the adjacent sheet so that the corrugation in each sheet which substantially intersects the axis of rotation is angularly disposed to the corrugation substantially intersecting the adjacent sheet by an amount equal to 180° divided by the number of sheets. For example, in the wheel 37, the corrugations intersecting the axis of rotation in sheets 50, 51 and 52 are disposed with respect to one another at an angle of 60°. In this manner, the wheel 37 is provided with substantial load bearing capacity throughout its rotation. Such wheels, therefore, while constructed of extremely inexpensive material have an appreciable useful life and are useable on wheeled vehicles for carrying not insubstantial loads, for example, three double-wall corrugated-paperboard sheets of 500 lb. bursting strength may support a load of 100 pounds per wheel. If desired, the useful life of the wheels may be extended with little increase in cost by affixing a paperboard rim on the outer edge of the wheel which is wear resistant and is waterproof.

It will be noted that the retainers 39 and 40 are only exemplary of means for retaining the wheels on the axle. The bearing 41 may serve as the retainer itself if secured to the axle by nails or the like and arranging the sheets so that sheet 50, having the inner diameter less than the bearing outer diameter, is the inboard sheet.

Having thus described exemplary embodiments of a wheeled container or vehicle and a wheel useable on such vehicles constructed in accordance to the present invention, it should be understood that the herein disclosed embodiments are exemplary only and that various alterations, modifications and adaptations may be made thereon within the scope of the present invention which is defined and limited only by the following claims.

We claim:

1. A wheeled vehicle comprising:
   a frame including relatively inflexible back and bottom portions;
   at least one foldable bag having front, rear, bottom and opposed side walls, said bottom wall having a transversely extending opening immediately adjacent said back wall for receiving said frame back portion;
   said bottom portion extending under the bottom of the bag;
   means for attaching said bag back wall and said frame back portion;
   axle means supported by said frame bottom portion;
   wheels rotatably mounted on said axle means; and
   means for securing said wheels on said axle means.

2. The wheeled vehicle of claim 1 wherein said frame comprises a single sheet of corrugated-paperboard having a transverse fold line to define said frame back and bottom portions.

3. The wheeled vehicle of claim 2 wherein said axle means comprises a transversely extending rigid member secured to the lower surface of said frame bottom portion adjacent said transverse fold line, said axle member extending outwardly beyond the side edges of said frame bottom portion.

4. The wheeled vehicle of claim 3 wherein each of said wheels comprises a plurality of laminated corrugated-paperboard sheets having an opening for receiving said axle member, each of said corrugated-paperboard sheets having inner corrugations, said plurality of sheets positioned so that the corrugation substantially intersecting the axis of rotation in each sheet is angularly disposed to the corrugation substantially intersecting the axis of rotation in every other sheet.

5. The wheeled vehicle of claim 4 wherein said means for securing said wheels on said axle means comprises a pair of fasteners removably secured on said axle so as to laterally confine each of said wheels at the outer ends of said axle means.

6. A light-weight economical and disposable shopping cart comprising:
   a frame formed from a rectangular single-sheet of corrugated-paperboard having a transverse fold line so as to define back and bottom portions when folded;
   at least one foldable high-strength paper bag having front, rear, bottom and opposed side walls, said bottom wall having a transverse opening immediately adjacent said back and receiving said frame back portion so that said bag bottom wall is supported by said frame bottom portion;
   means for attaching said bag back wall to said frame back portion;
   handle means supported at the upper end of said frame back portion;
   a wooden axle transversely fixedely secured beneath said frame bottom portion and extending outboard of both edges thereof;
   wheels mounted on the outboard ends of said axles, each of said wheels constructed of a plurality of laminated corrugated-paperboard sheets having openings in registry for receiving said axle, each of said corrugated-paperboard sheets having inner corrugations, said plurality of sheets positioned in relation to one another so that the axis of rotation in each sheet is angularly disposed to the corrugation substantially intersecting the axis of rotation in every other sheet.

7. In a wheeled vehicle comprising a rigid container including a bottom wall, axle means supported by the bottom wall, and means for securing wheels on the axle means, the combination therewith of:
   wheels mounted on said axle, each of said wheels constructed of a plurality of laminated corrugated-paperboard sheets having openings in registry for receiving said axle, each of said corrugated-paperboard sheets having inner corrugations, said plurality of sheets positioned in relation to one another so that the corrugation substantially intersecting the axis of rotation in each sheet is angularly disposed to the corrugation substantially intersecting the axis of rotation in every other sheet.

8. The combination of claim 7 wherein each of said plurality of sheets are positioned so that the corrugation substantially intersecting the axis of rotation in each sheet is disposed to the corrugation intersecting the axis of rotation in the next adjacent sheet at an angle substantially equal to 180° divided by the number of sheets comprising said wheel.

9. The combination of claim 8 wherein each of said sheets have a circular opening and additionally comprising a cylindrical cardboard bearing secured in the openings of said sheets, one of said sheets having a circular opening diameter less than the outer diameter of said bearing, each of said wheels being rotatably mounted on the axle means.

References Cited

UNITED STATES PATENTS

| | | | |
|---|---|---|---|
| 1,639,570 | 8/1927 | Lang | 301—63 |
| 2,985,462 | 5/1961 | Stamp. | |
| 3,135,527 | 6/1964 | Knapp | 280—36 |

LEO FRIAGLIA, Primary Examiner

JOHN A. PEKAR, Assistant Examiner

U.S. Cl. X.R.

16—45; 248—98; 301—63, 111